F. H. WITTERN.
WEATHER STRIPPING FOR VEHICLES.
APPLICATION FILED FEB. 15, 1921.

1,396,153.

Patented Nov. 8, 1921.

Inventor
Frank H. Wittern

UNITED STATES PATENT OFFICE.

FRANK H. WITTERN, OF FLANDREAU, SOUTH DAKOTA.

WEATHER-STRIPPING FOR VEHICLES.

1,396,153.

Specification of Letters Patent.   Patented Nov. 8, 1921.

Application filed February 15, 1921. Serial No. 445,121.

*To all whom it may concern:*

Be it known that I, FRANK H. WITTERN, a citizen of the United States, residing at Flandreau, in the county of Moody and State of South Dakota, have invented certain new and useful Improvements in a Weather-Stripping for Vehicles, of which the following is a specification.

This invention relates to weather stripping for automobile pedal slots and more particularly to a flexible filling for the slots through which the operating pedal extends.

The primary object of the invention is to provide a means for closing the longitudinal slots through which the foot pedals are extended so that heat and cold will be prevented from passing through the slots thereby affording greater comfort to the driver of the vehicle.

Other objects of the invention will appear upon consideration of the following detail description and accompanying drawings:—

Figure 1:
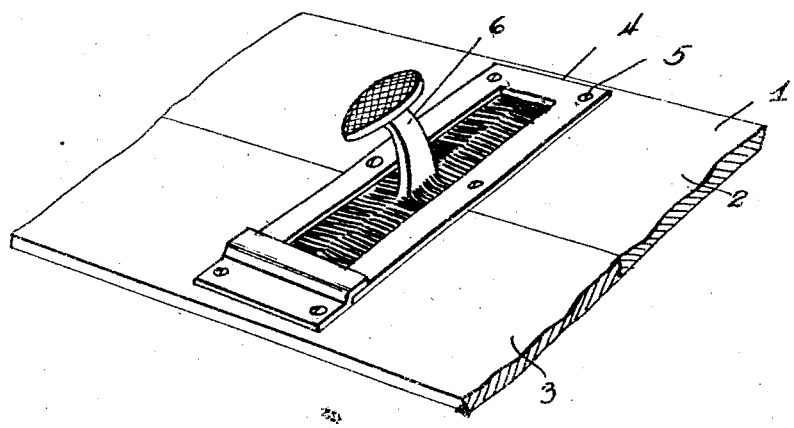
Figure 2:
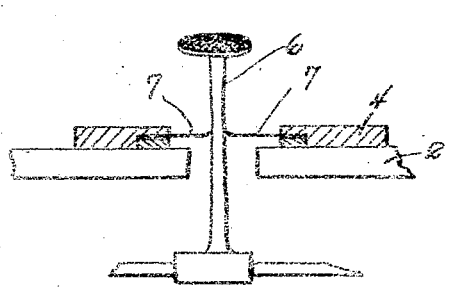
Figure 3:
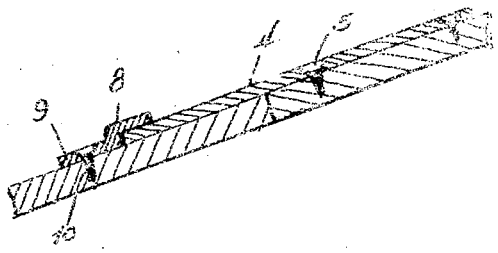

Figure 1 is a perspective view of a portion of the foot pedal of an automobile showing the application of the invention thereto, Fig. 2 is a transverse section through the same, Fig. 3 is a detail section through a portion of the invention.

Referring to the drawing by numerals, the base board 1 consists of a plurality of boards 2 and 3 which are preferably arranged so that they may be removed when desired. In the present instance the rectangular frame member 4 is secured to the foot board 2 by means of fastening elements 5 and the secured end is thereby permanently fixed to the board 2 while the opposite end of the frame projects over the top surface of the board 3. This frame extends around the slot in the board through which the foot pedal 6 is projected. The frame 4 is provided on its opposite longitudinal edges with a series of bristles 7 which extend toward the center of the longitudinal slots and their meeting ends are engaged so that the slots throughout the length of the same are entirely closed. The pedal 6, however, is projected through the slot so that the portion of the bristles which engage the pedal are slightly bent upwardly and the bristles by virtue of their flexibility will readily move when the pedal is actuated and will readily return to normal position so that the slots will be always closed. It will be understood that the bristles will be arranged very close together so that a fine mesh covering will be provided for the slot for the purpose of excluding hot air and cold air in the summer and winter respectively.

One end of the frame 4 is open and the open end is overlapped by a retaining flange 8 which is secured by a plate 9 having fastening members 10 extending therethrough and into the board 3. This will serve to retain the lower end of the frame 4 in position and at the same time will permit the removal of the upper foot board 4 without requiring the removal of the fastening screw 5.

Minor changes may be made in the details of description without departing from the spirit of the invention and scope of the claims hereunto appended.

What is claimed is:—

1. In combination with the foot pedal of an automobile, and the foot board having slots through which the said pedals extend, a frame extending around the slots in the foot board, a series of flexible bristles secured to the frame and covering the said slots.

2. In combination with an automobile foot pedal extending through a slot in the foot board of an automobile, a frame secured to the foot board around the said slot, bristles secured to the said frame at the longitudinal sides thereof and extending in opposite directions toward each other to meet in the center of the said slot whereby the slot is normally covered, the said foot pedal extending through the slot and thereby displacing certain of the said bristles.

3. A device of the character described comprising a rectangular frame, bristles secured to opposite sides of the frame and extending toward the center thereof, the free ends of the bristles meeting in the center of the frame, and means to hold the said frame in position.

4. A device of the character described comprising a rectangular frame, bristles secured to opposite sides of the frame and projecting toward the center thereof, whereby the open center of the said frame will be closed by the said bristles, means to secure one end of the frame stationarily in position, and means to maintain the opposite end of the frame in position.

In testimony whereof, I have affixed my signature in the presence of two witnesses.

FRANK H. WITTERN

Witnesses:
J. R. COONROD,
C. H. WHEALY.